(12) United States Patent
Wiseberg

(10) Patent No.: US 10,618,796 B2
(45) Date of Patent: Apr. 14, 2020

(54) SYSTEM AND APPARATUS FOR MIXING AND SELECTING FLUIDS AND DISPENSING BEVERAGES

(71) Applicant: Road Soda, LLC, Cheyenne, WY (US)

(72) Inventor: Mark Wiseberg, Cheyenne, WY (US)

(73) Assignee: Road Soda, LLC, Cheyenne, WY (US)

( * ) Notice: Subject to any disclaimer, the term of this patent is extended or adjusted under 35 U.S.C. 154(b) by 0 days.

(21) Appl. No.: 15/833,879

(22) Filed: Dec. 6, 2017

(65) Prior Publication Data

US 2018/0127259 A1 May 10, 2018

Related U.S. Application Data

(63) Continuation of application No. PCT/US2016/036287, filed on Jun. 8, 2016.

(60) Provisional application No. 62/172,538, filed on Jun. 8, 2015.

(51) Int. Cl.
   *B67D 1/12* (2006.01)
   *B67D 1/04* (2006.01)
   *A47J 31/41* (2006.01)
   *A47J 43/27* (2006.01)

(52) U.S. Cl.
   CPC .......... *B67D 1/1252* (2013.01); *A47J 31/41* (2013.01); *A47J 43/27* (2013.01); *B67D 1/0406* (2013.01); *B67D 2001/0487* (2013.01); *B67D 2001/1254* (2013.01); *B67D 2210/0006* (2013.01)

(58) Field of Classification Search
   CPC .......... B67D 1/1252; B67D 2001/0487; B67D 2001/1254
   See application file for complete search history.

(56) References Cited

U.S. PATENT DOCUMENTS

| | | | |
|---|---|---|---|
| 4,162,028 A | 7/1979 | Reichenberger | |
| 4,673,108 A | 6/1987 | de Man | |
| 4,928,850 A * | 5/1990 | Fallon | B67D 1/1252 137/114 |
| 8,596,494 B2 * | 12/2013 | Jones | B67D 1/0468 222/23 |
| 2007/0095852 A1 | 5/2007 | Murphy | |
| 2014/0069953 A1 | 3/2014 | Metropulos et al. | |

OTHER PUBLICATIONS

International Search Report issued for corresponding International Patent Application No. PCT/US2016/036287 dated Sep. 22, 2016.

* cited by examiner

*Primary Examiner* — J C Jacyna
(74) *Attorney, Agent, or Firm* — Myers Wolin, LLC

(57) ABSTRACT

A portable apparatus for mixing fluids comprising is provided, and has a housing, inlets for receiving a plurality of fluids at the housing, and a fluid mixer for receiving the fluids from the housing and mixing them. The fluid mixer outputs at least one fluid blend. A fluid blend selector then receives fluids from the inlets and at least one blend from the fluid mixer and outputs a selected fluid, where the selected fluid is one of the fluids from the inlets or one of the at least one fluid blends.

14 Claims, 7 Drawing Sheets

SYSTEM AND APPARATUS FOR MIXING AND SELECTING FLUIDS AND DISPENSING BEVERAGES

CROSS-REFERENCE TO RELATED APPLICATIONS

This application is a continuation under 35 U.S.C. § 120 of International Patent Application No. PCT/US2016/036287, filed Jun. 8, 2016, which takes priority from U.S. Provisional Patent Application No. 62/172,538, filed Jun. 8, 2015, the entirety of which is incorporated by reference herein.

FIELD OF THE INVENTION

This disclosure relates to portable systems for mixing fluids and delivering beverages to taps, such as a portable apparatus for mixing gasses for use in a beverage dispensing system.

BACKGROUND

Beverages to be distributed at a tap are typically provided and stored using pressurized containers and are connected to the tap using a conduit, such as a hose. Accordingly, when the tap is opened, the pressure in the pressurized container pushes the beverage stored in the container through the hose into the tap. However, when fluid is released to the tap, the pressure level will drop, as some of the internal pressure in the container has been relieved.

Accordingly, a system is needed to provide a pressurized fluid, such as a gas to the beverage container in order to maintain internal pressure in the container. Further, the gasses used to pressurize the container may also be used to infuse carbonation into a beverage, and the use of different gasses may provide different types or levels of carbonation. Accordingly, different gasses may be used to pressurize different drinks. For example, carbon dioxide may be used for some drinks, such as those requiring high level of carbonation, while nitrogen, or a mixture of carbon dioxide and nitrogen, may be used for other drinks requiring lighter carbonation.

Further, some drinks require no carbonation but do require aeration while others require no carbonation or aeration. For example, most shaken drinks and all stirred drinks typically require no carbonation. However, shaken drinks require aeration while stirred drinks require no aeration. Accordingly, pure nitrogen may be used to provide aeration with no carbonation.

Accordingly, when serving multiple beverages that require different levels or types of carbonation from taps, a user may require multiple systems for managing the different gasses or gas mixtures used to pressurize the different beverages. This is exacerbated when using a portable beverage system, since users may require different tanks and setups for each individual beverage.

Further, when serving mixed drinks using taps, rather than beer, the ingredients of mixed drinks tend to settle in storage containers. Users typically address this by shaking the storage container before distributing drinks. However, shaking the storage container is time consuming and results in unpredictable and uneven results. Accordingly, using a tap based system to distribute mixed drinks becomes impractical without sacrificing quality or the time benefits of a tap.

Further, mixed drinks are typically served either shaken or stirred. A shaken drink is shaken with ice to provide chilling, dilution, and aeration. Shaking the storage container will provide none of these effects, and therefore the approach of shaking the storage container to mix the contents of the container will not produce a shaken drink. Similarly, there is no analog to produce a stirred drink in a container.

Accordingly, there is a need for a portable apparatus to more easily select a fluid or a fluid mixture to use to pressurize beverages in a tap system. There is a further need for such an apparatus that is portable, and that is incorporated into a system that can produce shaken or stirred drinks automatically.

SUMMARY

One embodiment of an apparatus for mixing fluids provides a portable apparatus having a housing, a plurality of inlets for receiving a plurality of fluids, such as carbon dioxide and nitrogen, at the housing, a fluid mixer for receiving the plurality of fluids from the inlets and outputting at least one blend of the plurality of fluids, and a fluid blend selector for receiving the plurality of fluids from the inlets and the at least one fluid blend from the fluid mixer and outputting a first selected fluid consisting of one of the plurality of fluids and or the at least one fluid mixture for output. The apparatus further comprises an outlet for transmitting the selected fluid away from the housing.

The apparatus may further comprise fluid manifolds for receiving each of the plurality of fluids received from the inlets, and the fluid manifolds may each have a first conduit to the fluid blend selector and a second conduit to the fluid mixer.

In some embodiments, the fluid mixer may output a plurality of fluid blends. In such embodiments, the apparatus may have a first fluid blend manifold for receiving a first fluid blend from the fluid mixer and a second fluid blend manifold for receiving a second fluid blend from the fluid mixer. Each fluid blend manifold may then have a fluid conduit for transmitting the corresponding fluid blend to the fluid blend selector.

In some embodiments, the apparatus may be provided with a plurality of fluid blend selectors, each for outputting a selected fluid. Accordingly, each fluid manifold and fluid blend manifold may have a conduit leading to each of the plurality of fluid blend selectors.

Each fluid blend selector may comprise a selection manifold for receiving each of the plurality of fluids and each fluid blend from the fluid mixer and a controller for selecting one of the fluids received at the manifold. In some embodiments, the fluid blend selector may further comprises a pressure control for selecting or for viewing a pressure associated with the fluid output at the corresponding fluid selector.

The housing may be a suitcase, a briefcase, or another housing with multiple internal surfaces. In some embodiments, one surface may be provided with the fluid mixer, fluid manifolds, and fluid blend manifolds, and the second surface may be provided with the fluid blend selectors. In such an embodiment, the housing may open as a briefcase such that the first internal surface rotates relative to the second internal surface.

In some embodiments, the apparatus may be provided as part of a system, which may further comprise at least one beverage storage, and wherein the fluid mixer receives fluid from the inlets, selects a fluid or a fluid blend, and outputs the selection at an output of the apparatus to the at least one beverage storage. Beverages from the beverage storage may then be output at at least one tap.

In some embodiments, the beverage storage may be provided with a beverage storage inlet comprising a valve for receiving the fluid and a post for depositing the fluid within the beverage. In some embodiments, the post may be curved, such that the fluid is received within the beverage at an angle relative to a vertical axis of the beverage storage.

DETAILED DESCRIPTION OF THE PREFERRED EMBODIMENTS

Figure 1:
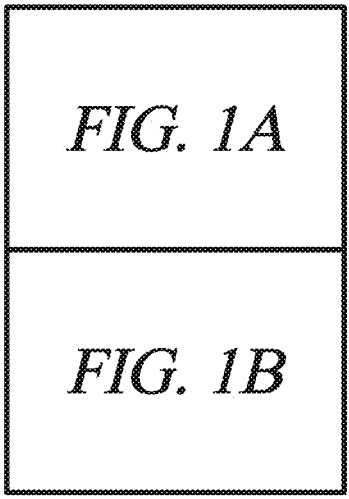
FIG. 1 is a diagram showing the relationship between FIGS. 1A and B.
Figure 1:

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

Figure 1A:
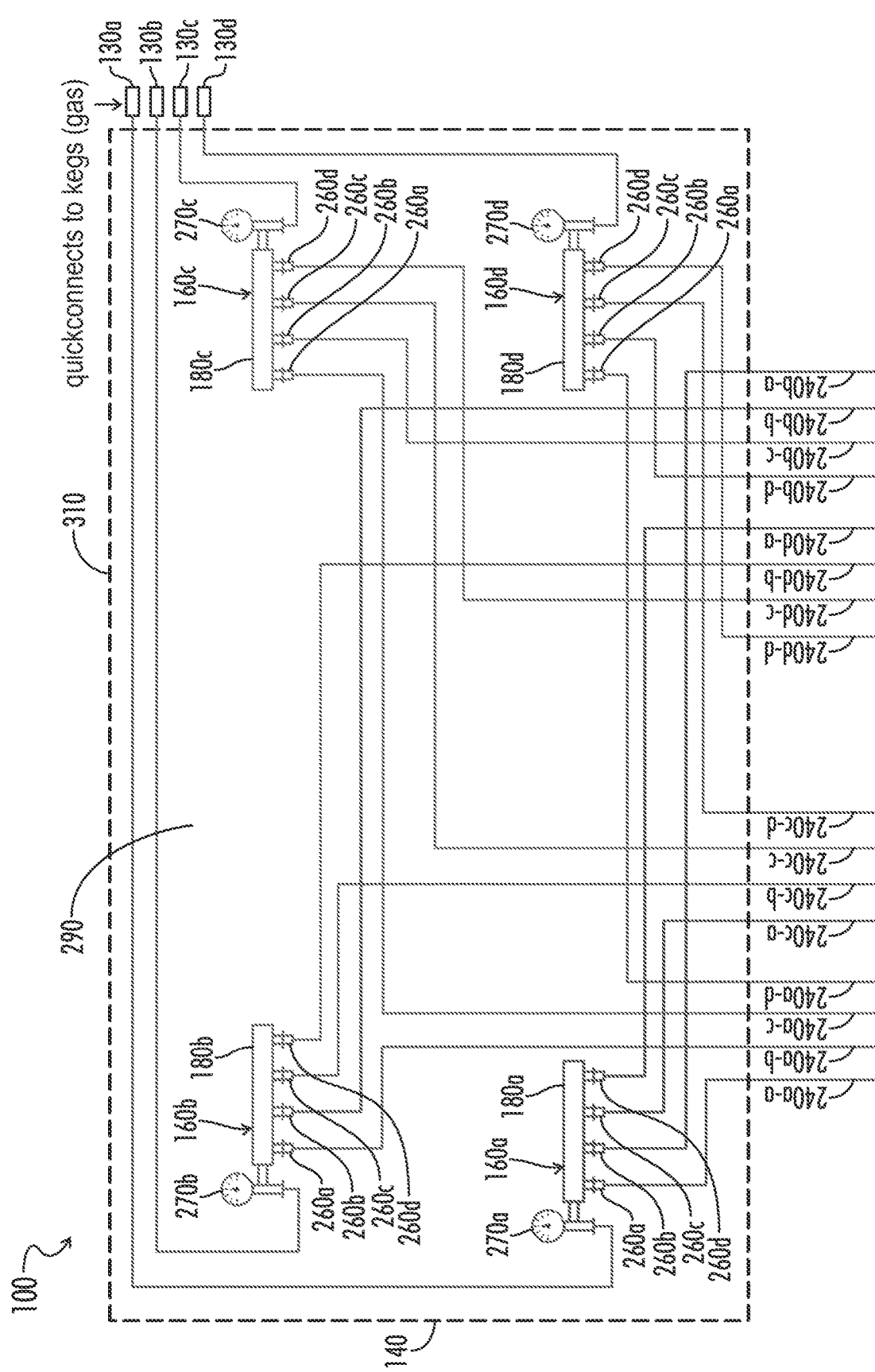
FIGS. 1A and 1B combine to form a schematic for an apparatus for mixing fluids.
Figure 1B:
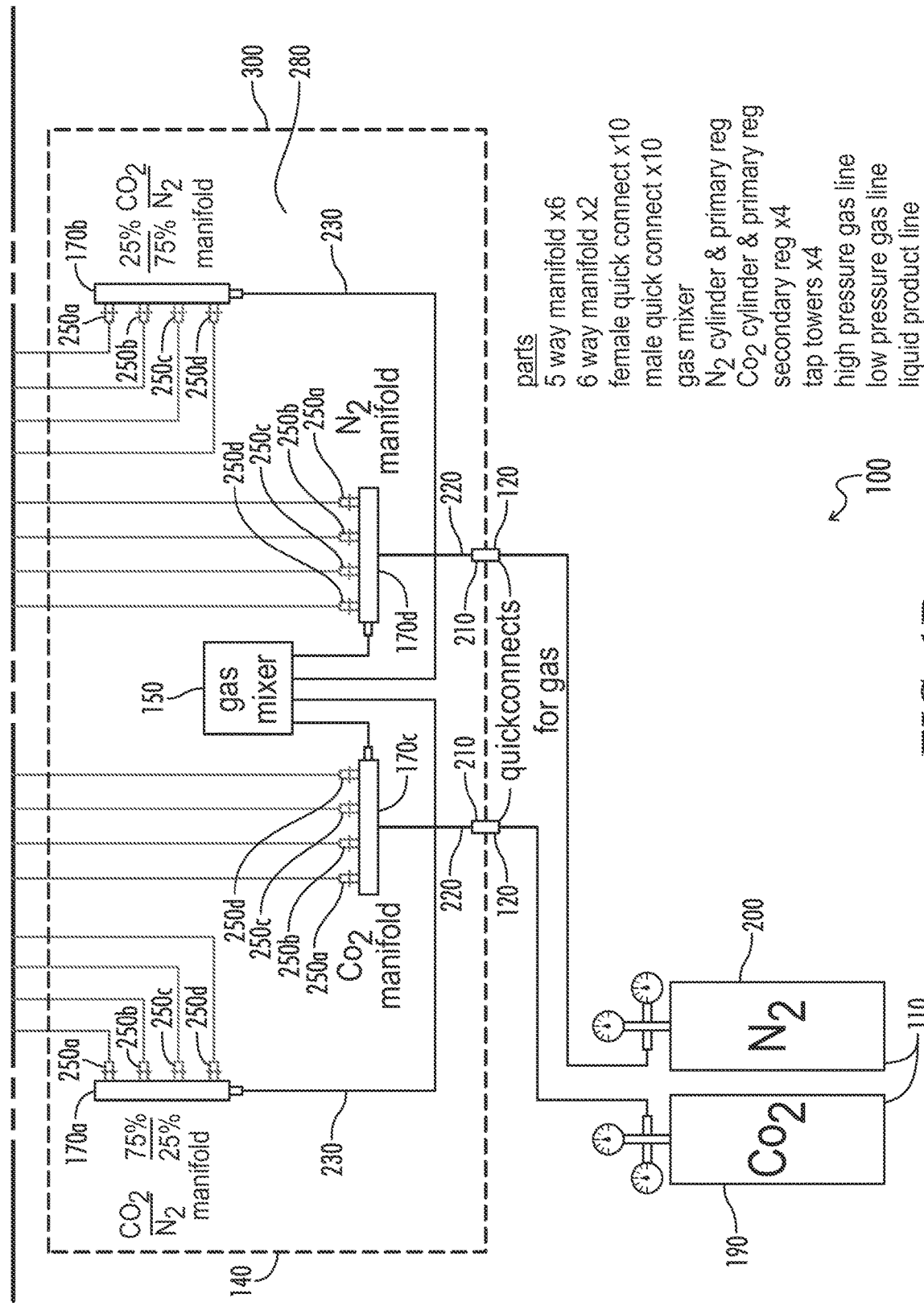
Figure 2:
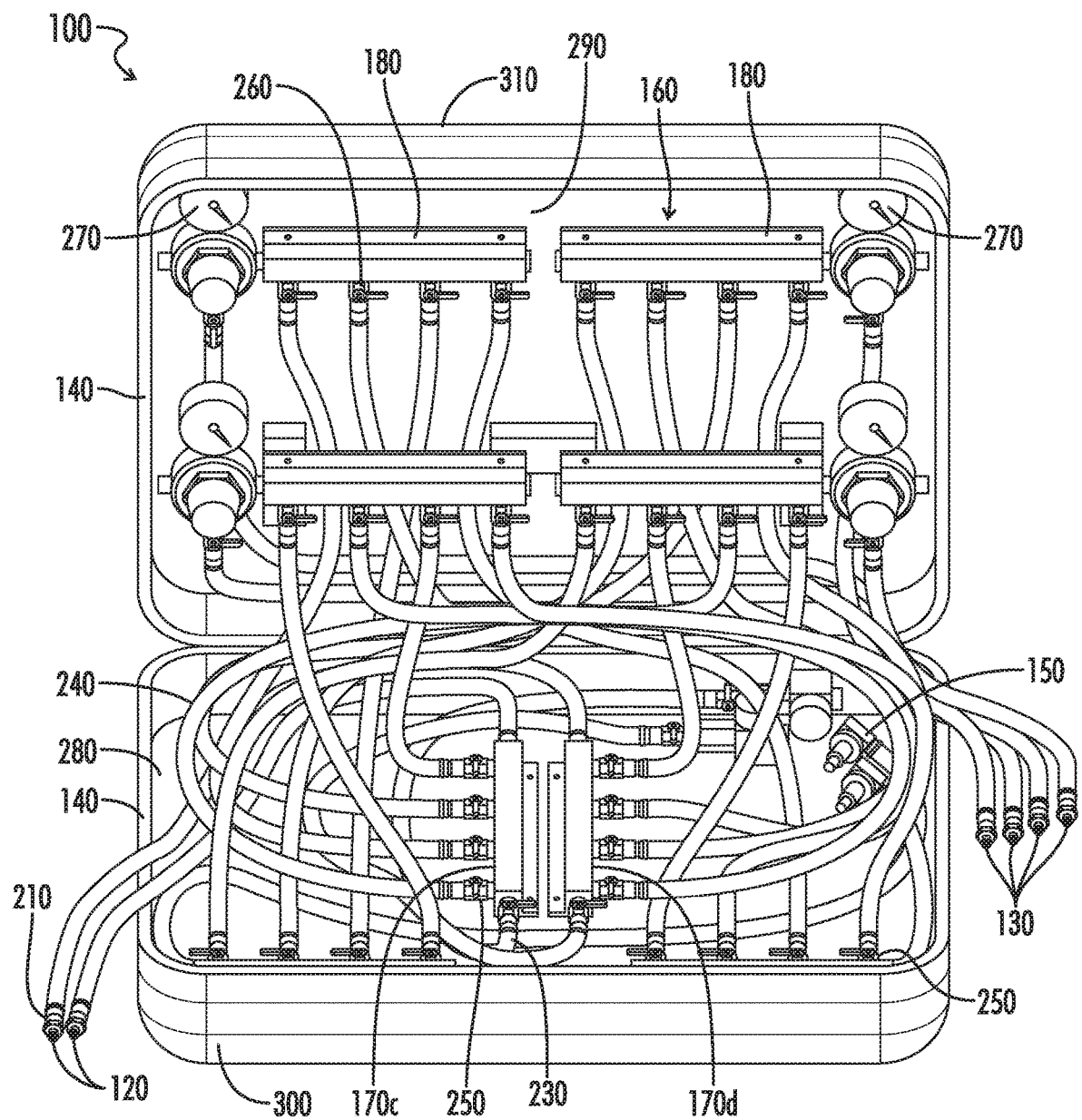
FIG. 2 shows the apparatus of FIGS. 1A and 1B.

FIG. 1 is a diagram showing the relationship between FIGS. 1A and B, which combine to form a schematic for an apparatus 100 for mixing fluids and FIG. 2 shows the apparatus schematically shown in FIGS. 1A and 1B. The apparatus 100 receives a plurality of fluids, such as carbon dioxide ($CO_2$) 190 and nitrogen ($N_2$) 200 gasses from gas tanks 110 at inlets 120, and outputs either one of those fluids or a blend of those fluids at outlets 130.

The apparatus is portable, and includes a housing 140, such as a briefcase or suitcase. The housing contains the inlets 120 as well as a fluid mixer 150 that receives the fluids from the inlets 120 and provides blends of the fluids to fluid selectors 160. The fluid selectors 160 receive the fluids from the inlets 120 and the blends from the fluid mixer 150 and are used to select a fluid, or blend of fluids, to send to each of the outlets 130. The routing, distribution, and selection of fluids are by way of various manifolds 170, 180, including fluid distribution manifolds 170 which distribute the fluids to each of the fluid selectors 160 and fluid selection manifolds 180 for providing use within the fluid selectors 160.

In the embodiment shown, two inlets 120 receive carbon dioxide ($CO_2$) 190 and nitrogen ($N_2$) 200 gasses from gas tanks 110 respectively. The inlets 120 may comprise, for example, quick connect valves 210 for easily connecting or disconnecting the gas tanks 110 from the housing 140. When received at the quick connect valves 210, the $CO_2$ 190 and $N_2$ 200 are routed by conduits 220 to a $CO_2$ manifold 170c and an $N_2$ manifold 170d respectively. The $CO_2$ manifold 170c and the $N_2$ manifold 170d each provide fluid to the fluid mixer 150 using further conduits.

The fluid mixer 150 blends the $CO_2$ 190 and $N_2$ 200 and provides two blends of fluids. It then provides a $CO_2$ blend to a $CO_2$ blend manifold 170a and an $N_2$ blend to an $N_2$ blend manifold 170b using mixer conduits 230. In some embodiments, the fluid mixer 150 actually comprises different units for each blend to be provided, while in others, the fluid mixer 150 is a single unit with a variety of blend outlets. As shown, the $CO_2$ blend sent to the $CO_2$ blend manifold 170a is 75% $CO_2$ and 25% $N_2$, while the $N_2$ blend sent to the $N_2$ blend manifold 170b is 75% $N_2$ and 25% $CO_2$. However, these percentages are provided as examples, and different fluid ratios may be used. Further, fluid ratios may be adjustable by users for different applications.

Fluids are distributed by each of the four fluid distribution manifolds 170a, b, c, d to each of four fluid selection manifolds 180a, b, c, d by separate conduits 240. Accordingly, each of the fluid distribution manifolds 170 has four distribution outlets 250a, b, c, d for providing fluid to the corresponding selection manifold 180. Correspondingly, each selection manifold 180 has a selection inlet 260a, b, c, d for receiving a fluid or fluid blend from the corresponding distribution manifold.

Accordingly, as an example, fluid selection manifold 180a receives $CO_2$ 190 from the $CO_2$ manifold 170c via distribution outlet 250a, conduit 240c-a, and selection inlet 260c, while fluid selection manifold 180c receives a $N_2$ blend from $N_2$ blend manifold 170b via distribution outlet 250c, conduit 240b-c, and selection inlet 260b.

Each selection inlet 260 at each fluid selection manifold 180 has a switch for selecting which inlet will provide fluid for distribution by the corresponding fluid selector 160. Further, each distribution outlet 250 may also have a switch for preventing or allowing the flow of fluids in the corresponding conduit 240 in order to, for example, shut off the apparatus 100 or diagnose problems within the apparatus.

Each fluid selector 160 provides a selected fluid to a corresponding outlet 130, and may have a pressure gauge 270 for evaluating pressure supplied by the fluid selector 160 to the outlets 130. The outlets may in turn provide the selected fluids to corresponding kegs, as described below. The pressure levels of the fluids and the fluid blends may be adjustable at the fluid selector 160 by utilizing a pressure controller, such as a secondary regulator, associated with each fluid selector. The pressure of the gasses 190, 200, at the tanks is typically higher than the maximum pressure utilized at the fluid selector in order to provide a full range of pressures at the secondary regulator.

In the embodiment shown, the housing 140 for the apparatus 100 is a case having two internal surfaces 280, 290. The first internal surface 280 has the fluid mixer 150 and the fluid distribution manifolds 170, while the second internal surface 290 has the fluid selectors 160, including the fluid selection manifolds 180. The apparatus 100 may be used in an open or closed configuration. When open, as shown in FIG. 2, the second internal surface 290 may rotate relative to the first internal surface 280 such that the second surface is approximately perpendicular relative to the first internal surface, and each internal surface has a sidewall segment 300, 310, adjacent the corresponding internal surface. While the inlets 120 and outlets 130 in the embodiment are shown as provided at the ends of conduits in FIG. 2, the inlet 120 may also be permanently installed as quick connect valves 210 in the sidewall segment 300 adjacent the first internal surface 280. Similarly, the outlets 130 may be permanently attached in the sidewall segment 310 adjacent the second internal surface 290.

In some embodiments, the apparatus 100 may be operable when the housing 140 is closed by connecting fluid conduits to the quick connect valves 210 for the inlet 120, and by connecting outlet conduits to the quick connect valves 210 for the outlet 130. In such an embodiment, the housing 140 may be opened in order to make adjustments, such as modifying the fluids selected at the fluid selector 160, or checking or adjusting pressure levels.

Figure 3:
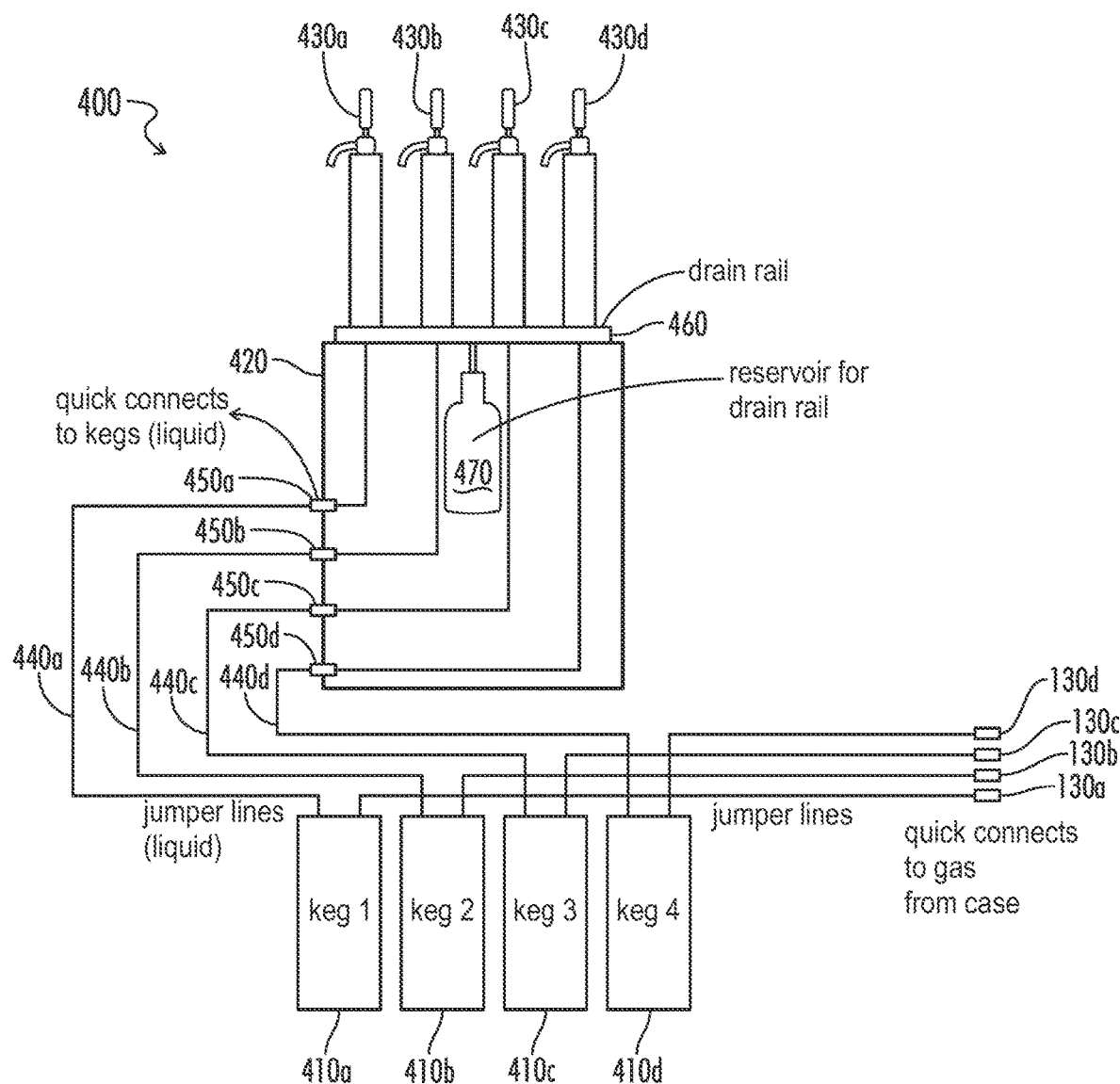
FIG. 3 is a schematic for a system for implementing the apparatus of FIG. 1.

FIG. 3 is a schematic for a system 400 for implementing the apparatus 100 of FIGS. 1A and 1B. The system comprises the apparatus 100 along with beverage storage containers 410a, b, c, d, such as kegs, and a tap assembly 420 containing taps 430a, b, c, d corresponding to each beverage storage container.

Upon selection of a fluid at the fluid selector 160a of the apparatus 100, the fluid selected flows through the corresponding outlet 130a of the apparatus to the corresponding storage container 410a. The fluid is then applied to an inlet in the beverage storage container 410a and the beverage stored within the container travels along a beverage conduit 440a to a corresponding beverage inlet 450a in a tap assembly 420. The beverage inlet 450a then feeds to a corresponding tap 430a which distributes the beverage.

The tap assembly 420 further comprises a drain rail 460 and a reservoir 470 for excess beverage distributed by the taps 430.

Figure 4:
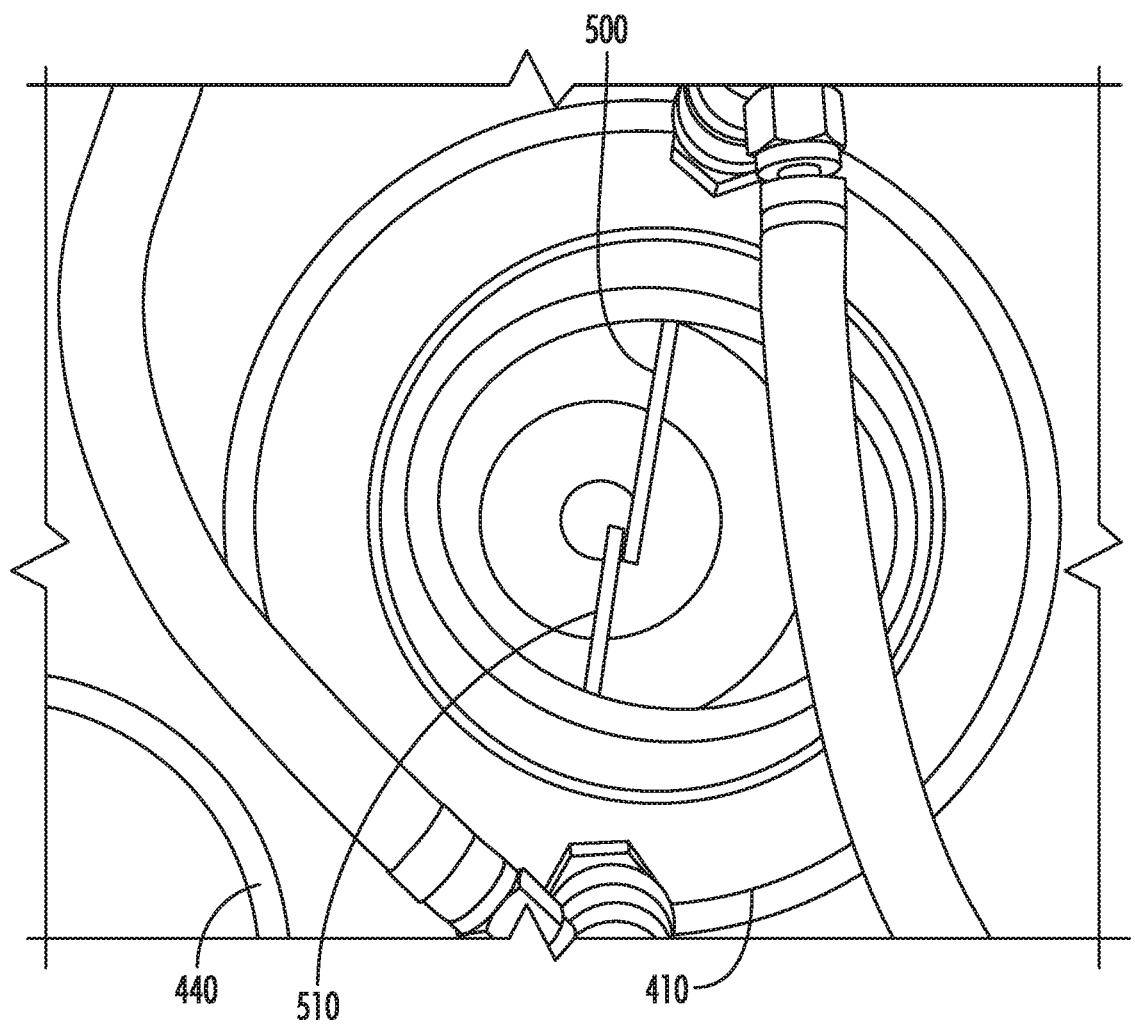
FIG. 4 is a beverage storage container for use in the system of FIG. 3.

FIG. 4 is a beverage storage container 410 for use in the system 400 of FIG. 3. As shown, a fluid post 500 may be provided for depositing the fluid into a beverage stored within the beverage storage container 410. When the beverage storage container 410 contains beverages, the fluid post 500 provides the fluid below the level of the beverage, such that the fluid may be infused into the beverage. For example, when the fluid is a gas, such as carbon dioxide, the post may infuse the beverage to add carbonation. Additionally, a beverage post 510 may be provided for providing the stored beverage to a beverage conduit 440. Accordingly, when fluid is provided at the fluid post 500, the fluid may be infused with the fluid while simultaneously providing pressure at the beverage post 510, and in turn, at the beverage conduit 440. When a tap 430 is opened at the tap assembly 420, pressure on a corresponding beverage conduit 440 may be relieved, and the fluid may flow from the beverage storage container 410 to the tap 430.

In some embodiments, the fluid post is a straight post for infusing the beverage, providing either combination or a "shaking" effect, for generating shaken drinks. In other embodiments, such as that shown, the fluid post is bent across the middle of the interior, and provides a whirlpool effect, for generating stirred drinks. Both of these effects mix the beverage stored in the beverage storage container 410 so that it is distributed at the tap 430 mixed.

Figure 5:
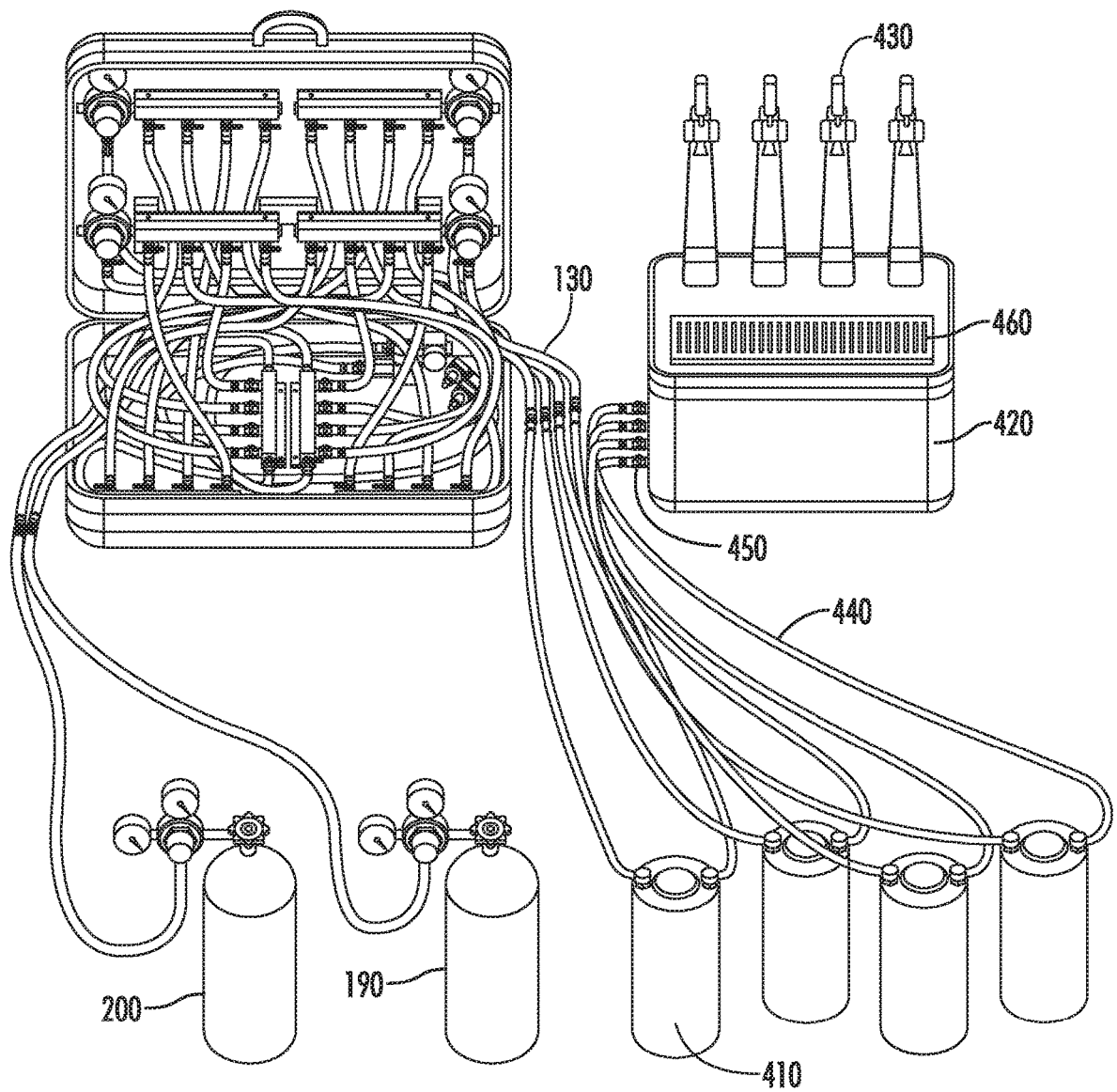
FIG. 5 shows additional components of the system of FIG. 3.

FIG. 5 shows additional components of the system 400 of FIG. 3. As shown, fluids are provided to the apparatus 100 and are distributed to several beverage storage containers 410. Beverages are then provided from the beverage storage containers 410 through the tap assembly 420 to individual taps 430.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A portable apparatus for mixing fluids comprising:
a housing;
a plurality of inlets for receiving a plurality of fluids at the housing;
a fluid mixer for receiving the plurality of fluids from the inlets and outputting at least one fluid blend;
a first fluid blend selector for receiving the plurality of fluids from the inlets and the at least one fluid blend from the fluid mixer and outputting a first selected fluid consisting of one of the plurality of fluids or the at least one fluid mixture;
a first outlet for transmitting the first selected fluid from the housing to a beverage storage, and
a first fluid manifold for a first of the plurality of fluids and a second fluid manifold for a second of the plurality of fluids, wherein each fluid manifold has a first conduit to the first fluid blend selector and a mixer conduit to the fluid mixer.

2. The portable apparatus of claim 1 further comprising a first fluid blend manifold for receiving a first fluid blend from the fluid mixer and a second fluid blend manifold for receiving a second fluid blend from the gas mixer, wherein each fluid blend manifold has a first conduit to the first fluid blend selector.

3. The portable apparatus of claim 1, wherein each fluid manifold has a second conduit to a second fluid blend selector, and the second fluid blend selector outputs one of the plurality of fluids or the fluid blend at a second outlet for transmitting the second selected fluid from the housing.

4. A portable apparatus for mixing fluids comprising:
a housing;
a plurality of inlets for receiving a plurality of fluids at the housing;
a fluid mixer for receiving the plurality of fluids from the inlets and outputting at least one fluid blend, a first fluid blend selector for receiving the plurality of fluids from the inlets and the at least one fluid blend from the fluid mixer and outputting a first selected fluid consisting of one of the plurality of fluids or the at least one fluid mixture; and a first outlet for transmitting the first selected fluid from the housing to a beverage storage, wherein the housing has two internal surfaces and wherein the fluid mixer is on a first of the surfaces and the first fluid blend selector is on the second of the surfaces.

5. The portable apparatus of claim 4 wherein the first internal surface further contains:

a first fluid manifold for a first of the plurality of fluids and a second fluid manifold for a second of the plurality of fluids, wherein each fluid manifold has a first conduit to the first fluid blend selector and a second conduit to a second fluid blend selector and a mixer conduit to the fluid mixer; and a first fluid blend manifold for receiving a first fluid blend from the fluid mixer and a second fluid blend manifold for receiving a second fluid blend from the fluid mixer, wherein each fluid blend manifold has a first conduit to the first fluid blend selector and a second conduit to the second fluid blend selector, and wherein the second internal surface further contains the second fluid blend selector.

6. The portable apparatus of claim 4 wherein the housing opens such that the first internal surface rotates relative to the second internal surface.

7. The portable apparatus of claim 1 wherein the first gas mixture selector further comprises a pressure control for selecting a pressure associated with the fluid output at the first fluid selector.

8. A system for dispensing beverages comprising:
a housing containing:
a plurality of inlets for receiving a plurality of fluids at the housing;
a fluid mixer for receiving the plurality of fluids from the inlets and outputting at least one fluid blend;
a first fluid blend selector for receiving the plurality of fluids from the inlets and the at least one fluid blend from the fluid mixer and outputting a first selected fluid consisting of one of the plurality of fluids or the at least one fluid mixture;
a first fluid output for transmitting the first selected fluid from the housing; and
a first fluid manifold for a first of the plurality of fluids and a second fluid manifold for a second of the plurality of fluids, wherein each fluid manifold has a first conduit to the first fluid blend selector and a mixer conduit to the fluid mixer, and
a first beverage storage;
wherein the fluid mixer receives a plurality of fluids from the plurality of inlets, and the first fluid blend selector receives the plurality of fluids and a fluid blend from the fluid mixer and outputs one of the plurality of fluids or the fluid blend at the first fluid output to the first beverage storage.

9. The system of claim 8 further comprising a first fluid blend manifold for receiving a first fluid blend from the fluid mixer and a second fluid blend manifold for receiving a second fluid blend from the fluid mixer, wherein each fluid blend manifold has a first conduit to the first fluid blend selector.

10. The system of claim 8, wherein each fluid manifold has a second conduit to a second fluid blend selector and the second fluid blend selector receives the fluid blend from the fluid mixer, and the second fluid blend selector outputs one of the plurality of fluids or the fluid blend to a second beverage storage.

11. The system of claim 8, wherein the first beverage storage outputs a first beverage to a first tap.

12. The system of claim 8, wherein the first beverage storage receives one of the plurality of fluids or the fluid blend from the first fluid outlet and the fluid is received within a beverage in the first beverage storage.

13. The system of claim 12 wherein a beverage storage inlet comprises a valve for receiving the fluid and a post for depositing the fluid within the beverage.

14. The system of claim 13 wherein the post is curved such that the fluid is received within the beverage at an angle relative to a vertical axis of the beverage storage.

* * * * *